March 22, 1932.  F. N. KELSEY  1,850,111
COMBINED AIR GAUGE AND SELF CLOSING OUTLET FITTING
Filed Sept. 10, 1928  2 Sheets-Sheet 1
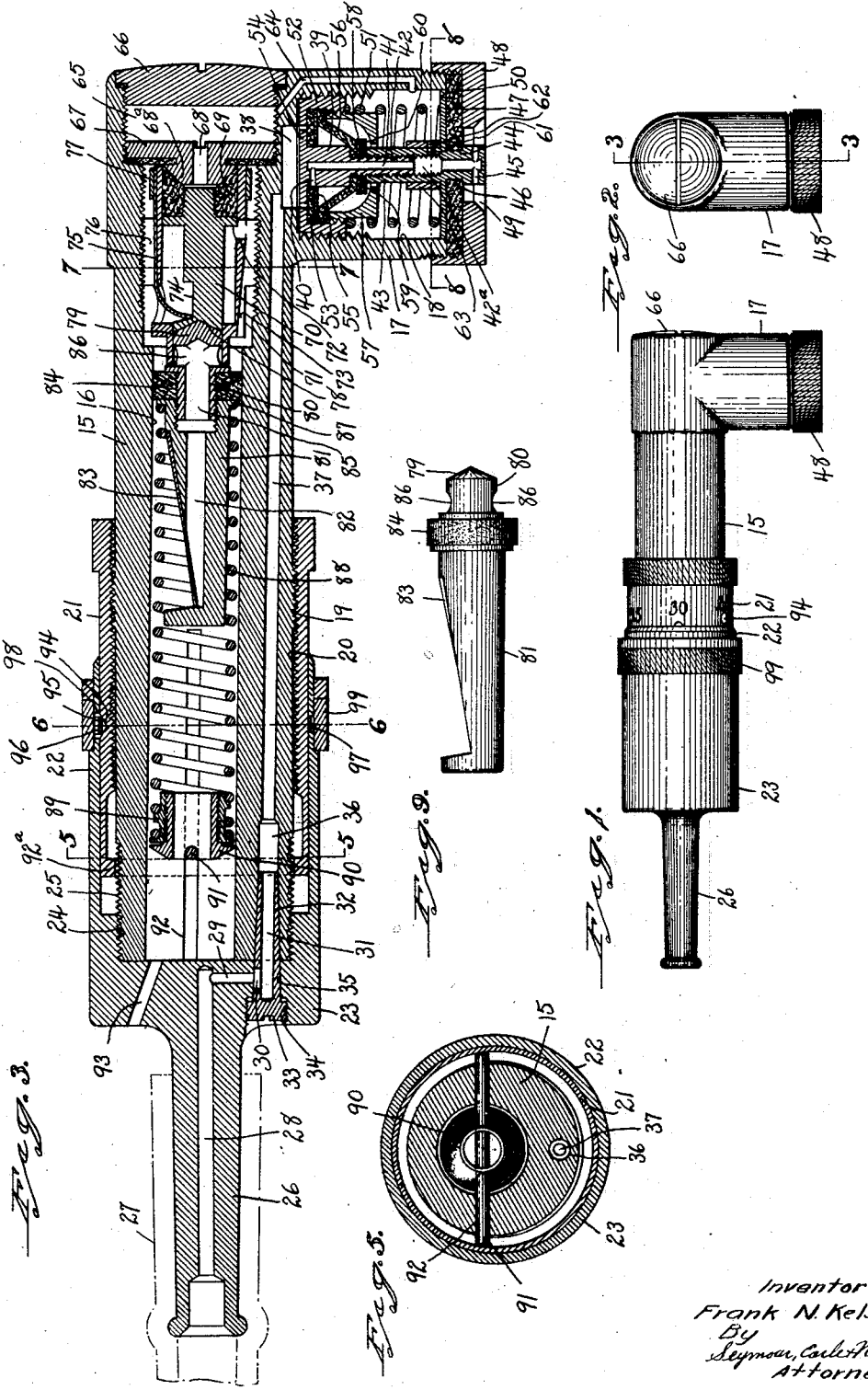
Inventor
Frank N. Kelsey
By
Seymour, Carle & Nichols
Attorneys March 22, 1932.  F. N. KELSEY  1,850,111
COMBINED AIR GAUGE AND SELF CLOSING OUTLET FITTING
Filed Sept. 10, 1928  2 Sheets-Sheet 2
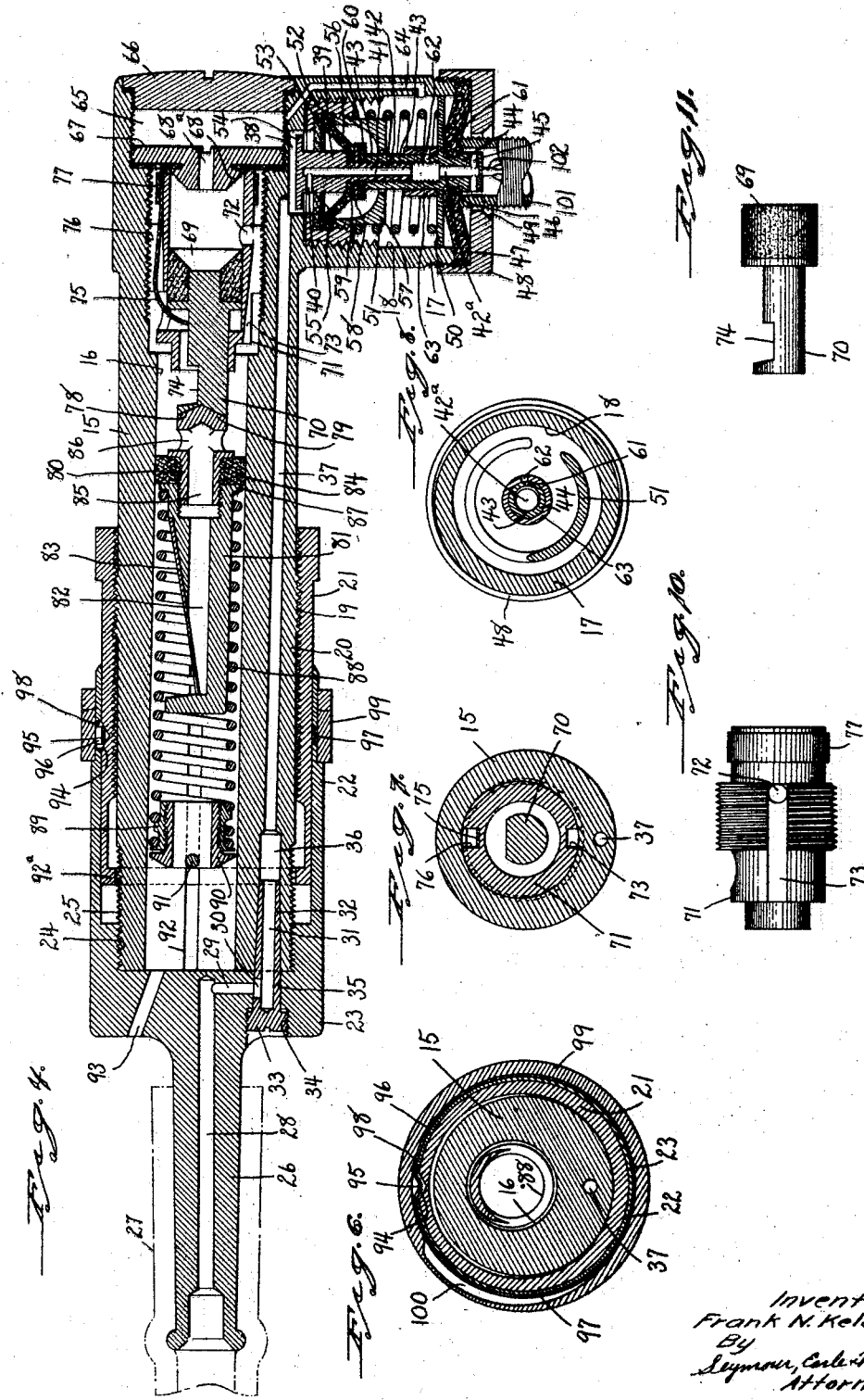
Inventor
Frank N. Kelsey
By
Seymour, Earle & Nichols
Attorneys Patented Mar. 22, 1932

1,850,111

UNITED STATES PATENT OFFICE

FRANK N. KELSEY, OF NEW HAVEN, CONNECTICUT, ASSIGNOR OF ONE-HALF TO PAUL C. SWOLE, OF CLINTON, CONNECTICUT

COMBINED AIR GAUGE AND SELF CLOSING OUTLET FITTING

Application filed September 10, 1928. Serial No. 304,916.

This invention relates to an improvement in combined air-gauges and self-closing outlet-fittings commonly known as air-chucks and designed for use as terminal-fittings for air-hose used in connection with the inflation of tires, though not so limited.

The object of this invention is to produce a convenient and reliable fitting of the type referred to which will signal the user when a predetermined air-pressure has been built up in the tire, etc., being inflated or charged.

With this object in view, my invention consists in a combined air-gauge and self-closing outlet-fitting having certain details of construction and combinations of parts as will be hereinafter described and particularly recited in the claims.

In the accompanying drawings:

Fig. 1 is a view in side elevation of a combined air-gauge and self-closing outlet-fitting constructed in accordance with my invention;

Fig. 2 is a view thereof in front-end elevation;

Fig. 3 is an enlarged-scale central longitudinal section taken on the line 3—3 of Fig. 2 and showing the parts in their normal positions;

Fig. 4 is a view corresponding to Fig. 3 but showing the parts in the positions which they assume after the fitting has been applied to a tire-valve nipple and after the air has been built up in the tire to the predetermined degree so as to actuate the combined relief- and-signal valve-plunger;

Fig. 5 is a view in transverse section on the line 5—5 of Fig. 3;

Fig. 6 is a corresponding view on the line 6—6 of Fig. 3;

Fig. 7 is a corresponding view on the line 7—7 of Fig. 3;

Fig. 8 is a corresponding view on the line 8—8 of Fig. 3;

Fig. 9 is a detached side view of the combined spring-seat and audible signal-unit;

Fig. 10 is a similar view of the signal-and-relief valve-unit; and

Fig. 11 is a similar view of the signal-and-relief valve-plunger.

In carrying out my invention as herein shown, I employ a tubular body-member 15 having a long substantially axial bore 16 and provided at its outer end with a short tubular neck 17 offsetting from it at a right-angle and formed with an axial chamber 18.

About midway of its length the body-member 15 has offsetting from its periphery a series of threads 19 which interengage with the threads 20 formed upon the interior of an adjusting-sleeve 21 which has sleeved over it in turn the cup-shaped forward end 22 of a cap-member 23 which is formed internally with threads 24 interengaging with threads 25 upon the extreme rear end of the body-member 15 aforesaid. The rear end of the cap-member 23 has projecting outward from it a nipple 26 over which the end of an air-hose 27 is adapted to be sleeved, as shown by broken lines in Figs. 3 and 4 of the drawings.

The nipple 26 of the cap-member 23 is formed with an axial passage 28 intersecting at its inner end a radial passage 29, the outer end of which registers with a port 30 leading out of a central passage 31 formed in a tapered plug 32 having an externally-threaded head 33 seated in an internally-threaded recess 34 formed in the rear face of the cap-member 23. The said plug-member 32 is seated in a short bore 35 formed in the cap-member and has its forward end extended into a bore 36 formed in the rear end of the body-member 15.

Leading forward from the bore 36 just above mentioned is a longitudinal air-passage 37 intersecting at its extreme forward end a recess 38 formed in the bottom of the chamber 18 of the neck 17 so as to conduct air to the said chamber from the hose 27.

The egress of the air from the recess 38 is controlled by a reciprocating outlet valve-plunger 39 having a radial port 40 intersecting an axial passage 41 opening through the outer end of the externally-threaded stem 42 of the said valve-plunger and adapted to conduct air to an aligned axial passage $42^a$ formed in the internally-threaded shank 43 of an outlet-valve extension-member 44 having its extreme outer end provided with two radial outlet-ports 45 leading outward from the axial passage $42^a$ aforesaid.

Near its outer end the extension-member 44 is formed with an annular recess 46 receiving the inner edge of a washer-like flexible diaphragm 47 which has its outer edge pinched between the outer face of the neck 17 and a cap 48 threaded thereon, as clearly shown in the drawings, and provided with a central clearance-passage 49 surrounding the extreme outer end of the outlet-valve extension-member 44.

Directly back of the diaphragm 47 the extension-member 44 is formed with a disc-like annular flange 50 which backs-up the said diaphragm and is adapted to reciprocate within the chamber 18 in the neck 17 aforesaid. The flange 50 forms a seat for the outer end of a helical spring 51 located in the said chamber and encircling the said valve-extension member and bearing at its inner end against the outer face of a cup-shaped bushing 52 externally threaded for engagement with threads formed internally within the chamber 18, as shown in the drawings, and seated at the extreme bottom thereof.

Positioned within the cup-shaped bushing 52 aforesaid is a fibrous disc-like valve-seat 53 through which the valve-plunger 39 extends and which is adapted to be engaged by the overhanging head 54 thereof to prevent the escape of air outward from the recess 38. The said head 54 is normally maintained against the inner face of the seat 53 by the tension of the helical spring 51.

Bearing against the outer face of the valve-seat 53 is a metallic washer 55 which is interposed between the same and the outer edge of a conical diaphragm 56 which is clamped in place in the bushing 52 aforesaid by means of a clamping-cup 57 which is exteriorly-threaded, as shown, for engagement with threads formed internally within the said bushing 52. The said diaphragm 56 is composed of elastic material and has its center perforated, as shown, for the passage through it of the stem 42 of the valve-plunger 39 to which it is attached by a clamping-nut 58 threaded upon the shank and clamping the inner edge of the said diaphragm against a shoulder 59 formed on the said valve-plunger. A fibrous washer 60 is placed against the outer face of the said nut 58 and is held against the same by the inner end of the shank 43 of the outlet-valve extension-member 44 so as to prevent the leakage of air past the threads which connect the said shank and the stem 42 of the valve-plunger 39 together.

Leading radially outward from the bore 42ª in the outlet-valve extension-member 44 is a by-pass channel 61 with which is registered a by-pass port 62 formed in an adjusting sleeve 63 encircling the inner portion of the shank 43 of the extension-member 44, so as to be adjustable thereon to vary the amount of air permitted to pass outward through the by-pass channel 61.

When the valve-plunger 39 is pushed inward as will hereinafter appear, air is forced outward through the by-pass channel 61 and the by-pass port 62 in the sleeve 63 and into the chamber 18. Intersecting the said chamber at its lower end is a passage 64, the upper end of which leads into a chamber 65 formed at the extreme forward end of the bore 16 of the main body-member 15 between a plug 66 threaded into the extreme outer end of the said chamber and a partition-disc 67 also threaded into the said chamber in spaced relation to the plug 66.

The said partition-disc is formed with an axial passage 68 and on its rear face with an axially-arranged conical projection 68ª which latter is engaged by a sealing-washer 69 carried upon the forward end of a reciprocating combined relief-and-signal valve-plunger 70 which has sliding bearing within a valve-body 71 threaded into the bore 16 of the body-member 15 just back of the partition-plate 67 aforesaid and provided with a radial passage 72 intersecting a longitudinal groove 73 cut in its periphery.

The valve-plunger 70 is formed in one side with a transverse notch 74 receiving the inwardly-curved inner end of a detent-spring 75 which is positioned within a longitudinal groove 76 formed in the valve-body 71 and clamped in place by means of a collar 77 encircling the reduced forward end of the said valve-housing and axially adjustable thereon to vary the tension of the said detent-spring.

The rear end of the valve-plunger 70 is conically concaved as at 78 and receives the conically-pointed forward end 79 of a terminal piece 80 which is screwed into the forward end of a combined spring-seat and vibrator-body 81. The said vibrator-body is formed with an axial passage 82 into the rear end of which an inclined reed or vibrator 83 projects, its forward end being secured by solder or other means to the forward end of the body 81.

The terminal piece 80 aforesaid serves to hold in place against the forward end of the vibrator-body 81 a packing-washer 84 which reciprocates within the bore 16, as will hereinafter appear. The said terminal-piece 80 is formed with an axial air-passage 85 connecting with the passage 82 in the vibrator-body aforesaid and having radial passages 86 leading into it from the periphery of the said terminal piece.

Encircling the major portion of the vibrator-body 81 and seated against an annular flange 87 thereon is a helical spring 88 positioned within the bore 16 of the body-member 15 and having its rear end encircling the sleeve-like outer member 89 of a two-part adjustable spring-seat which also comprises an inner or main member 90. The said outer member is internally-threaded, as shown, for co-action with threads formed externally upon the inner member 90, so that one may be rotated with respect to the other to move the outer member longitudinally and thus vary the tension of the spring 88.

The inner member 90 of the two-part spring-seat just above described carries a diametrically arranged pin 91, the respective outer ends of which extend outward through and slide in oppositely-located slots 92 formed in the rear-end of the body-member 15 and are engaged by the forward face of an annular flange 92ª inwardly-projecting from the extreme rear end of the adjusting-sleeve 21.

To permit the ready escape of the air from the bore 16 of the body after the same has vibrated the reed 83 as will hereinafter appear, I provide the rear face of the cap-member 23 with a vent-passage 93 connecting the rear end of the said bore 16 with the atmosphere.

From the construction previously described, it will be apparent that by turning the adjusting-sleeve 21 in one direction or the other it will, through the mediary of the flange 92, pin 91, and the two-part spring-seat 89—90, effect the tension of the spring 88. To yieldingly hold the said adjusting-sleeve in different positions of adjustment, I form the same upon its periphery with a series of pockets 94 adapted to receive an inwardly-offset bend 95 formed in a segmental locking-spring 96 positioned in a shallow annular groove 97 in the periphery of the cup-shaped forward end 22 of the cap-member 23 near the forward end thereof. The said bend 95 of the locking-spring 96 reaches inward to engage the pockets 94 through a radial-passage 98 leading inward from the groove 97 aforesaid. Positioned over the groove 97 aforesaid to confine the spring 96 therein is an oscillatable knurled collar 99 formed in its inner face with a segmental groove 100, which latter is adapted to be brought in line with the bend 95 to permit the same to be sprung outward when it is desired to turn the adjusting-sleeve 21.

In the use of my improved fitting the neck 17 thereof is slipped over a tire-nipple 101 which projects inward through the clearance-opening 49 therein and has its upper end engaged with the under face of the flexible diaphragm 47, as shown in Fig. 4 of the drawings. At this time the extreme outer end of the outlet-valve extension-member 44 engages the usual valve-stem 102 of the said tire-nipple and opens the valve therein in the usual way to permit the passage of air into the tire to which the said nipple is attached.

The entry of the tire-valve nipple 101 into the outer end of the neck 17 forces the diaphragm inward and with it the outlet-valve extension-member 44 and the outlet-valve plunger 39. This movement moves the parts from the position shown in Fig. 3 to the position shown in Fig. 4, which lifts the valve-head 54 clear of its seat 53 and permits air to flow into the tire-valve nipple from the hose 27 via the passages 28 and 29, port 30, passage 31, bore 36, passage 37, recess 38, port 40, passages 41 and 42ª, and the radial outlet-ports 45.

Coincidental with the opening of the valve 44 to permit the flow of air into the tire-valve nipple as above described, air is also permitted to flow outward through the by-pass channel 61, by-pass port 62, and into the chamber 18, from which place it is conducted by the passage 64 to the chamber 65 in the forward end of the body-member, from which chamber the air passes through the axial passage 68 in the partition-disc 67, so as to exert its pressure against the forward end of the combined relief and signal valve-plunger 70.

Now as the air pressure is gradually built up within the tire or other object being inflated or charged, the pressure will similarly be built up in the chamber 65 and the passage 68, with the effect ultimately of moving the said plunger 70 rearward against the tension of the spring 88 until such time as the front wall of the notch 74 therein engages the inwardly-turned end of the detent-spring 75, at which time the movement of the said plunger will be temporarily halted.

It may be mentioned in this connection that the tension of the detent-spring 75 is of a predetermined amount which, for convenience, may be presumed to offer a resistance to the movement of the valve-plunger 70 equivalent to fifteen pounds air pressure exerted thereon, though it is obvious that it may be set for other predetermined pressure, if desired.

Now, when the pressure built up within the tire and exerted against the forward end of the valve-plunger 70 exceeds the predetermined pressure for which the detent-spring is set, it will snap the inwardly-turned end of the said spring outward and thereby be suddenly relieved of the restraint of the said spring and snap rearward into the position in which it is shown in Fig. 4, with the effect, as shown, of uncovering the radial port 72 in the valve-body and permit the air to escape therethrough and through the peripheral passage 73, thence inward through the passages 86 in the terminal-piece 80 through the axial passages 85 and 82, from which latter passage the air will escape into the bore 16 by vibrating the reed or vibrator 83, from whence it will pass outward from the said bore through the relief or vent port 93 in the cap-member 23.

The vibration of the reed 83 is a signal to the user of my improved fitting that the pressure within the tire has reached the pressure for which the adjusting-sleeve 21 had been set. Upon hearing the signal given by the vibration of the reed 83, the operator removes the fitting from the tire-valve nipple which permits the spring 51 in the neck of the fitting to move the head 54 of the outlet-valve 39 outward against its seat 53 with the effect of preventing the further egress of air from the recess 38 and hence from the supply-tube 27. This closure of the valve 39 as just described also shuts off the supply of air to the vibrator 83 which will immediately cease to function. I wish to call particular attention to the action of the detent-spring 75 which prevents the port 72 in the valve-body 71 from being slowly uncovered which would prevent the building-up of the required pressure within the tire being inflated before the reed 83 was actuated. As has been previously described, the valve-plunger 70 is permitted to move a predetermined distance free of any restraint by the said detent-spring without, however, uncovering the port 72. After the said valve-plunger has moved a predetermined distance, the front wall of its notch 74 will engage the inwardly-turned end of the detent-spring 75 and be retained in that position until such time as the air pressure exerted against its forward end is sufficient to not only overcome the predetermined tension of the helical spring 88 but also to cam, so to speak, the inner end of the detent-spring outward. This sudden release of the restraint of the detent-spring 75 as above described permits the plunger 70 to snap rearward and uncover the port 72. By this arrangement, the building-up of the desired pressure within the tire is not prevented by the gradual uncovering of the port 72.

Another feature which is of particular importance in my improved fitting is the diaphragm 56, which prevents the escape of air from the recess 38 through any other channel than that of the port 62 in the sleeve 63 encircling the shank 43 of the valve extension member 44.

It is highly important in a device of the type to which my invention relates to be able to regulate the amount of air escaping outward through the by-pass passage 61 which effects the movement of the relief-valve plunger 70. As has been previously described, the sleeve 63 affords a convenient and reliable means of adjusting the flow of air in question, since by rotating it with respect to the valve-extension member, it may be caused to restrict the escape of air through the channel 61 aforesaid therein.

I claim:

1. A device of the character described comprising a hollow body; a reciprocating valve-plunger located within the said body and formed with a detent-shoulder; a substantial L-shaped resilient detent also mounted in the said body and having one end located in position to be engaged by the said detent-shoulder and its other end locked in place by an axially slidable band; whereby the tension of the said resilient detent may be varied by a slight movement of the said band.

2. A device of the character described comprising a hollow body; a bushing mounted within the said body; a reciprocating valve-plunger sliding within the said bushing and formed with a detent-shoulder; a substantial L-shaped resilient detent having one end located in position to engage the said detent-shoulder of the said valve-plunger and its other end held in place upon an exterior surface of the said bushing by an axially sliding band; whereby the tension of the said detent may be varied by a sliding movement of the said band with respect to the said bushing.

3. A device of the character described comprising a hollow body; a combined relief and signal valve mounted in the said body and including a valve-plunger formed with a detent-shoulder, an air-operated audible signal device arranged in the said body in line with the said plunger so as to be moved thereby; an adjustable spring bearing against the said audible signal device which it partly encircles in position to act therethru to urge the said valve-plunger into its closed position; and a yielding detent-finger engaging the aforementioned detent-shoulder in the plunger of the relief and signal valve to yieldingly resist the opening thereof until a predetermined air-pressure has been built up in the object being inflated.

4. A device of the character described comprising a hollow body; a signal-valve mounted in the said body and including a valve-body formed with a radial port and valve-plunger reciprocating in said valve-body and normally covering the radial port therein; an adjustable spring arranged in said body to urge the said plunger into position to cover the said radial port; and a yielding detent engaging the said valve-plunger to resist the movement thereof until a predetermined air-pressure has been built up in the object being inflated.

In testimony whereof, I have signed this specification.

FRANK N. KELSEY.